United States Patent
Chishti (10) Patent No.: US 10,348,900 B2
(45) Date of Patent: *Jul. 9, 2019

(54) TECHNIQUES FOR BEHAVIORAL PAIRING MODEL EVALUATION IN A CONTACT CENTER SYSTEM

(71) Applicant: Afiniti Europe Technologies Limited, Cheshire (GB)

(72) Inventor: Zia Chishti, Washington, DC (US)

(73) Assignee: Afiniti Europe Technologies Limited, Cheshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,933

(22) Filed: Oct. 17, 2017

(65) Prior Publication Data

US 2018/0167510 A1 Jun. 14, 2018

Related U.S. Application Data

(63) Continuation of application No. 15/377,397, filed on Dec. 13, 2016, now Pat. No. 9,888,121.

(51) Int. Cl.
*H04M 3/51* (2006.01)
*G06Q 10/06* (2012.01)
*H04M 3/523* (2006.01)

(52) U.S. Cl.
CPC .... *H04M 3/5232* (2013.01); *G06Q 10/06311* (2013.01); *H04M 3/5183* (2013.01); *H04M 2203/556* (2013.01)

(58) Field of Classification Search
CPC ............. H04M 3/5232; H04M 3/5138; H04M 2203/556; G06Q 10/06311

USPC ................. 379/265.01, 266.01, 309, 265.11; 705/7.13

See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft.com, Issue Jun. 2002 (3 pages).

(Continued)

*Primary Examiner* — Quynh H Nguyen
(74) *Attorney, Agent, or Firm* — Wilmer Cutler Pickering Hale and Dorr LLP (57) ABSTRACT

Techniques for behavioral pairing model evaluation in a contact center system are disclosed. In one particular embodiment, the techniques may be realized as a method for behavioral pairing model evaluation in a contact center system comprising determining an ordering of a plurality of agents, determining an ordering of a plurality of contact types; analyzing, historical contact-agent outcome data according to the orderings of the pluralities of agents and contact types to construct a pairing model; and determining an expected performance of the contact center system using the pairing model.

21 Claims, 4 Drawing Sheets

(56) References Cited

U.S. PATENT DOCUMENTS

| | | |
|---|---|---|
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |

(56) References Cited

U.S. PATENT DOCUMENTS

| | | |
|---|---|---|
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0064080 A1 | 3/2017 | Chishti et al. |
| 2017/0064081 A1 | 3/2017 | Chishti et al. |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/017517 A1 | 4/1999 |
| WO | WO-2001/063894 A2 | 8/2001 |
| WO | WO-2006/124113 A2 | 11/2006 |
| WO | WO-2009/097018 A1 | 8/2009 |
| WO | WO-2010/053701 A2 | 5/2010 |
| WO | WO-2011/081514 A1 | 7/2011 |

OTHER PUBLICATIONS

Canadian Office Action issued in Canadian Patent Application No. 2713526, dated Oct. 25, 2016, 7 pages.

Cleveland, William S., "Robust Locally Weighted Regression and Smoothing Scatterplots," Journal of the American Statistical Association, vol. 74, No. 368, pp. 829-836 (Dec. 1979).

Cormen, T. H., et al., "Introduction to Algorithms," 3rd Edition, Chapter 26 Maximum Flow, pp. 708-766 and Chapter 29 Linear Programming, pp. 843-897 (2009).

Extended European Search Report issued by the European Patent Office for European Application No. 17154781.3 dated May 4, 2017 (7 pages).

Extended European Search Report issued by the European Patent Office for European Application No. 17171761.4 dated Aug. 30, 2017 (8 pages).

Gans, N. et al. (2003), "Telephone Call Centers: Tutorial, Review and Research Prospects," Manufacturing & Service Operations Management, vol. 5, No. 2, pp. 79-141, 84 pages.

(56) References Cited

OTHER PUBLICATIONS

International Preliminary Report on Patentability issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2017/000570 dated Jun. 30, 2017 (13 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Japanese Office Action issued by the Japanese Patent Office for Japanese Application No. 2016-159338 dated Oct. 11, 2017 (12 pages).
Japanese Office Action issued by the Japanese Patent Office for Japanese Application No. 2016-189126 dated Oct. 19, 2017 (24 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Nocedal, J. and Wright, S. J., "Numerical Optimization," Chapter 16 Quadratic Programming, pp. 448-496 (2006).
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report issued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Aurhority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2008/077042 dated Mar. 13, 2009, 6 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.

TECHNIQUES FOR BEHAVIORAL PAIRING MODEL EVALUATION IN A CONTACT CENTER SYSTEM

CROSS-REFERENCE TO RELATED APPLICATIONS

This application is a continuation of U.S. patent application Ser. No. 15/377,397, filed Dec. 13, 2016, which is hereby incorporated by reference in its entirety as if fully set forth herein.

FIELD OF THE DISCLOSURE

This disclosure generally relates to model evaluation for pairing contacts and agents in contact centers and, more particularly, to techniques for behavioral pairing model evaluation in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated herein by reference.

A BP strategy may develop a model of agents, or agent groups and contact types, from which expected gains over other pairing strategies may be determined. However, there are currently no techniques for improving model generation and validation to optimize expected gains.

In view of the foregoing, it may be understood that there is a need for a system that enables improving behavioral pairing model selection to improve the efficiency and performance of pairing strategies that are designed to choose among multiple possible pairings.

SUMMARY OF THE DISCLOSURE

Techniques for behavioral pairing model evaluation in a contact center system are disclosed. In one particular embodiment, the techniques may be realized as a method for behavioral pairing model evaluation in a contact center system comprising determining an ordering of a plurality of agents, determining an ordering of a plurality of contact types; analyzing, historical contact-agent outcome data according to the orderings of the pluralities of agents and contact types to construct a pairing model; and determining an expected performance of the contact center system using the pairing model.

In accordance with other aspects of this particular embodiment, a behavioral pairing correction factor may be applied to the pairing model prior to determining the expected performance.

In accordance with other aspects of this particular embodiment, the pairing model may be a behavioral pairing model and/or based on a diagonal pairing strategy.

In accordance with other aspects of this particular embodiment, a second expected performance of the contact center system may be determined using a FIFO pairing strategy, and an expected gain of the contact center system may be determined using the pairing model instead of the FIFO pairing strategy.

In accordance with other aspects of this particular embodiment, a second pairing model may be constructed based at least on a second ordering of a second plurality of contact types different from the first plurality of contact types, a second expected performance of the contact center system may be determined using the second pairing model, the second expected performance based on the second pairing model may be compared with the expected performance based on the pairing model, and one of at least the pairing model and the second pairing model may be selected based on the comparing of the expected performance and the second expected performance.

In accordance with other aspects of this particular embodiment, new contact-agent outcome data may be determined, the pairing model may be updated based on the new contact-agent outcome data, and an updated expected performance of the contact center system may be determined using the updated pairing model.

In another particular embodiment, the techniques may be realized as a system for behavioral pairing model evaluation in a contact center system comprising at least one computer processor configured to operate in the contact center system, wherein the at least one computer processor is configured to perform the steps in the above-discussed method.

In another particular embodiment, the techniques may be realized as an article of manufacture for behavioral pairing model evaluation in a contact center system comprising a non-transitory processor readable medium and instructions stored on the medium, wherein the instructions are configured to be readable from the medium by at least one computer processor configured to operate in the contact center system and thereby cause the at least one computer processor to operate to perform the steps in the above-discussed method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email) or outbound contacts. At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated herein by reference.

In some embodiments, a contact center may switch (or "cycle") periodically among at least two different pairing strategies (e.g., between FIFO and a BP strategy). Additionally, the outcome of each contact-agent interaction may be recorded along with an identification of which pairing strategy (e.g., FIFO, PBR, or BP) had been used to assign that particular contact-agent pair. By tracking which interactions produced which results, the contact center may measure the performance attributable to a first strategy (e.g., FIFO) and the performance attributable to a second strategy (e.g., BP). In this way, the relative performance of one strategy may be benchmarked against the other. The contact center may, over many periods of switching between different pairing strategies, more reliably attribute performance gain to one strategy or the other. Benchmarking pairing strategies is described in, e.g., U.S. patent application Ser. No. 15/131,915, filed Apr. 18, 2016, which is incorporated herein by reference.

A BP strategy may develop a model of agents or agent groups and contact types, from which expected gain over other pairing strategies may be determined. Therefore, techniques for improved model generation and validation are desirable to optimize the expected gain.

In view of the foregoing, it may be understood that there is a need for a system that enables improving behavioral pairing model selection to improve the efficiency and performance of pairing strategies that are designed to choose among multiple possible pairings.

Figure 1:
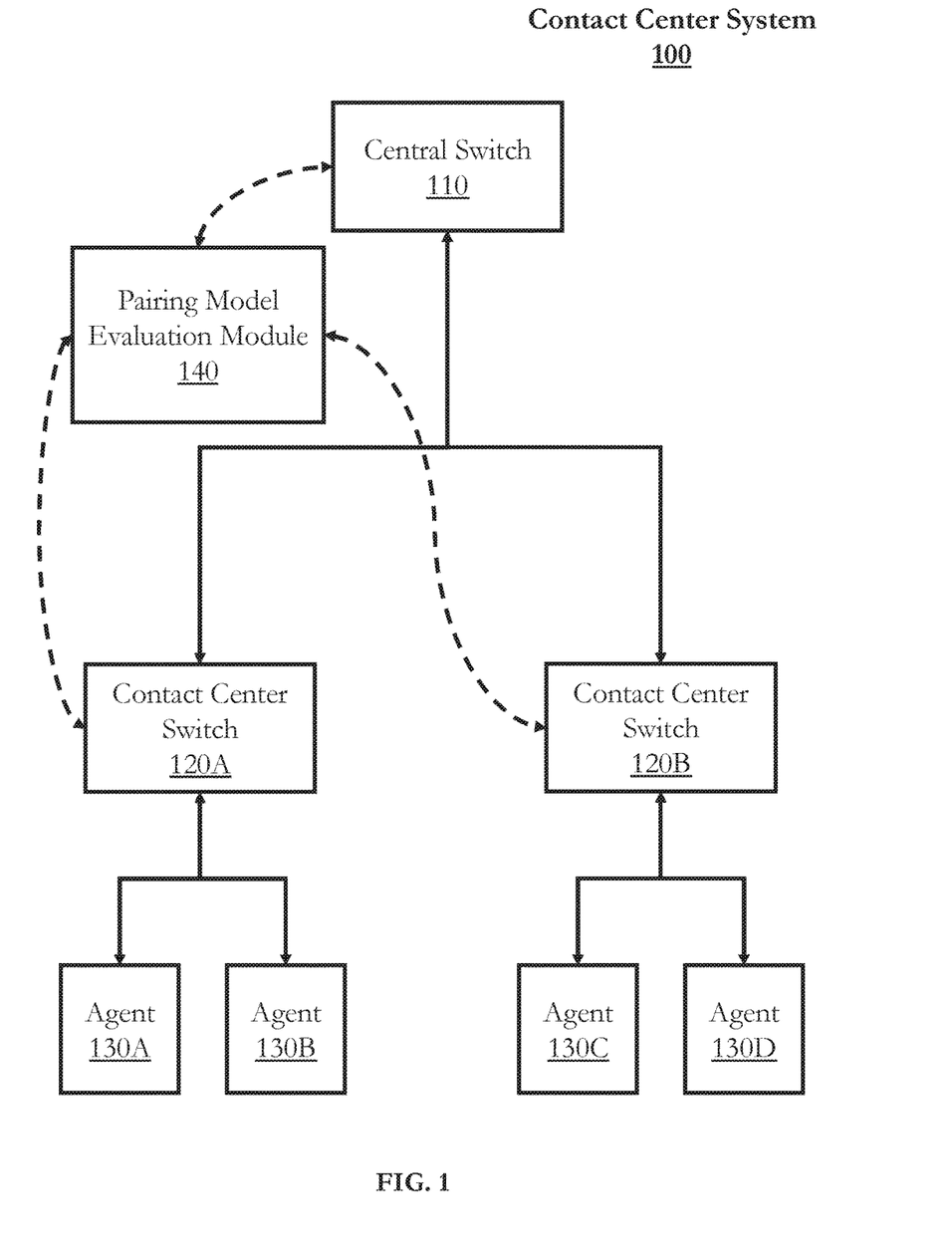
FIG. 1 shows a block diagram of a contact center according to embodiments of the present disclosure.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third party vendor. In the example of FIG. 1, pairing model evaluation module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple pairing model evaluation modules (e.g., a BP model evaluation module). In some embodiments, pairing model evaluation module 140 may be embedded within a component of a contact center system (e.g., embedded in or otherwise integrated with a switch). The pairing model evaluation module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of pairing model evaluation module 140 or one or more switches such as central switch 110 or contact center switches 120A and 120B. In some embodiments, a pairing model evaluation module may determine which pairing module may handle pairing for a particular contact. For example, the pairing model evaluation module may alternate between enabling pairing via the BP module and enabling pairing with the FIFO module. In other embodiments, one pairing module (e.g., the BP module) may be configured to emulate other pairing strategies. For example, a pairing model evaluation module, or a pairing model evaluation component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

Figure 2:
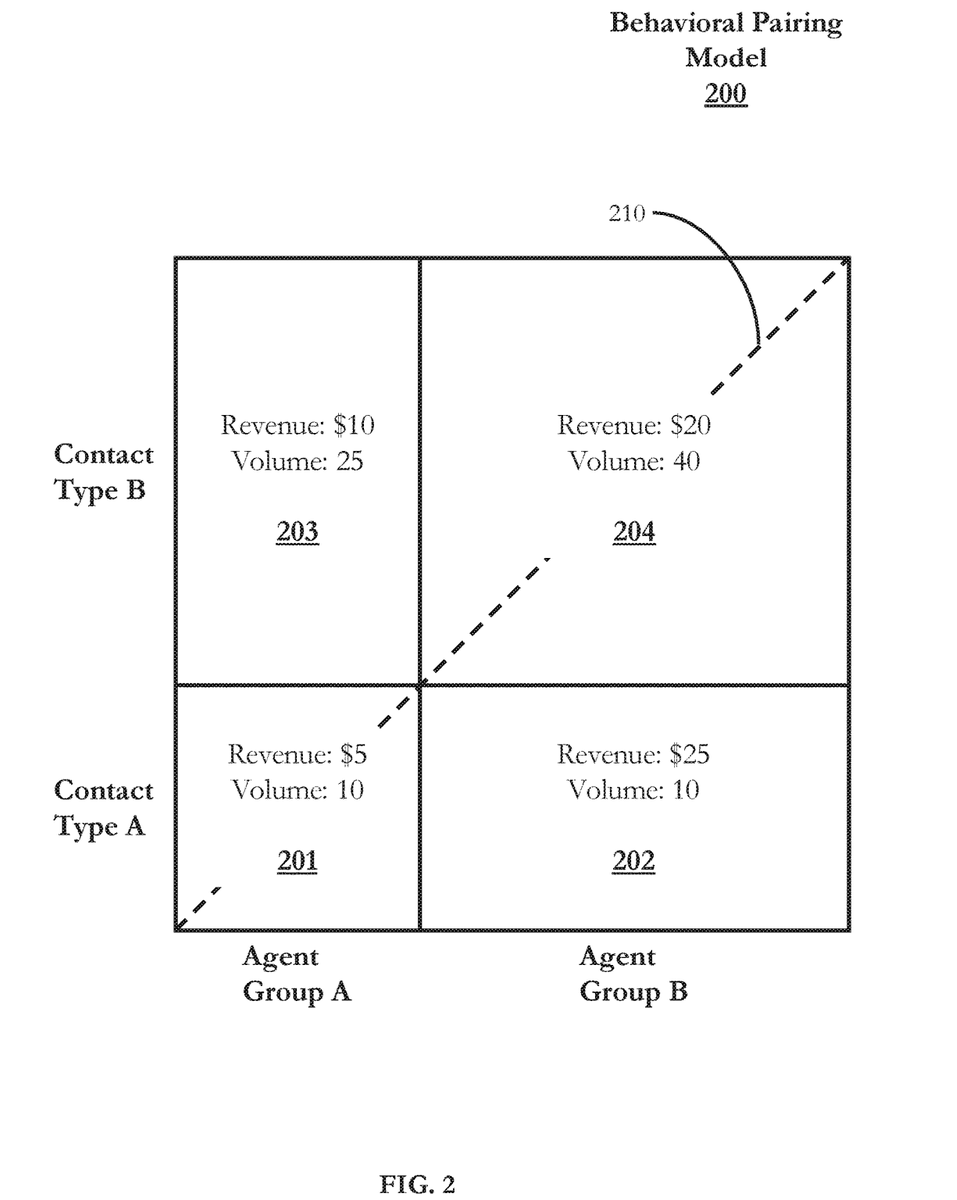
FIG. 2 depicts a schematic representation of a BP model according to embodiments of the present disclosure.

FIG. 2 depicts a schematic representation of a BP model 200 according to embodiments of the present disclosure. BP model 200 is a simple 2×2 model with an ordering of two groups of agents (Agent Group A and Agent Group B) and an ordering of two types of contacts (Contact Type A and Contact Type B). In real-world contact centers, there may be dozens, hundreds, or more agents or groups ordered in a model, and there may also be many more types of contacts ordered in a model.

In BP model 200, there are four pairwise possibilities: a contact of Contact Type A is paired with an agent of Agent Group A (pairing 201); a contact of Contact Type A is paired with an agent of Agent Group B (pairing 202); a contact of Contact Type B is paired with an agent of Agent Group A (pairing 203); and a contact of Contact Type B is paired with an agent of Agent Group B (pairing 204).

In the hypothetical of BP model 200, a review of historical contact outcome data shows the following: pairing 201 shows a volume of 10 contacts and an average revenue of $5 per contact; pairing 202 shows a volume of 10 contacts and an average revenue of $25 per contact; pairing 203 shows a volume of 25 contacts and an average revenue of $10 per contact; and pairing 204 shows a volume of 40 contacts and an average revenue of $20 per contact.

One technique for computing the expected average revenue per contact across all contact-agent pairings is to compute the weighted average across all possible pairings as shown below in Equation 1:

$$(25\cdot10+40\cdot20+25\cdot10+10\cdot5)/(25+40+25+10)=13.5 \quad \text{(Eq. 1)}$$

Thus, the expected revenue per contact in a typical FIFO pairing is $13.50 per contact.

In some embodiments of a BP strategy, the contact center system (via, e.g., a BP component or module embedded or communicatively coupled to the contact center system) may preferably pair contacts to agents along a diagonal of the model (e.g., diagonal 210). In the example of BP model 200, Contact Type A may be preferably paired to Agent Group A, and Contact Type B may be preferably paired to Agent Group B given optimal availability of choice.

One technique for estimating the expected revenue per contact under a BP strategy is to compute the weighted average across all preferred pairings as shown below in Equation 2:

$$(40\cdot20+10\cdot5)/(40+10)=17 \quad \text{(Eq. 2)}$$

Thus, the expected revenue per contact appears to be $17 per contact, and the expected gain or improvement over a FIFO pairing strategy is $3.50 per contact, or a gain of almost 26% over FIFO.

The computation shown in Eq. 2 implicitly assumes that calls paired using a BP strategy will be distributed uniformly throughout the pairings 201 and 204, and it computes the weighted proportion of pairings falling uniformly in a square grid with area 10 of pairing 201 to the proportion of pairings falling uniformly in a square grid of area 40 of pairing 204.

However, in practice, the BP strategy is likely to hew more closely to the diagonal with respect to the distance or Z-score that a particular pairing of an ordered contact and an ordered agent will fall from the diagonal. A more accurate estimate of expected gain for BP over FIFO may account for a narrower set of contact-agent pairings along the diagonal, computing instead the proportion of pairings falling uniformly along or near the diagonal through each pairing. In some embodiments, a weighted average according to the proportional length of the diagonal through each preferred pairing under a BP strategy may be computed. Thus, in some embodiments, the adjusted expected revenue per contact is only $15 per contact, and the adjusted expected gain or improvement over a FIFO pairing strategy is only $1.50 per contact, or a gain of about 11%.

In practice, the real-world gain measured using BP model 200 is more likely to be 11% than 26%. Consequently, it may be advantageous to determine the "adjusted diagonal" rather than the "unadjusted diagonal" of Equation 2. The ability to evaluate expected values and gain of BP models has many benefits, including more accurate revenue/cost-saving forecasting, and improved ability to select optimal models. For example, given a choice between two possible models of ordering contact types and agents (e.g., "Model A" and "Model B"), Model A could show a higher gain than Model B using the unadjusted diagonal computation, whereas Model B could show a higher gain than Model A using the adjusted diagonal computation. In this case, it would be preferable to apply Model B for BP in the contact center system to maximize the real-world expected gain.

In some situations, a model might appear to have a positive expected gain using the unadjusted diagonal computation, but will actually have a negative expected gain (i.e., a loss) using the adjusted diagonal computation. An example of such a model is described below with reference to FIG. 3.

Figure 3:
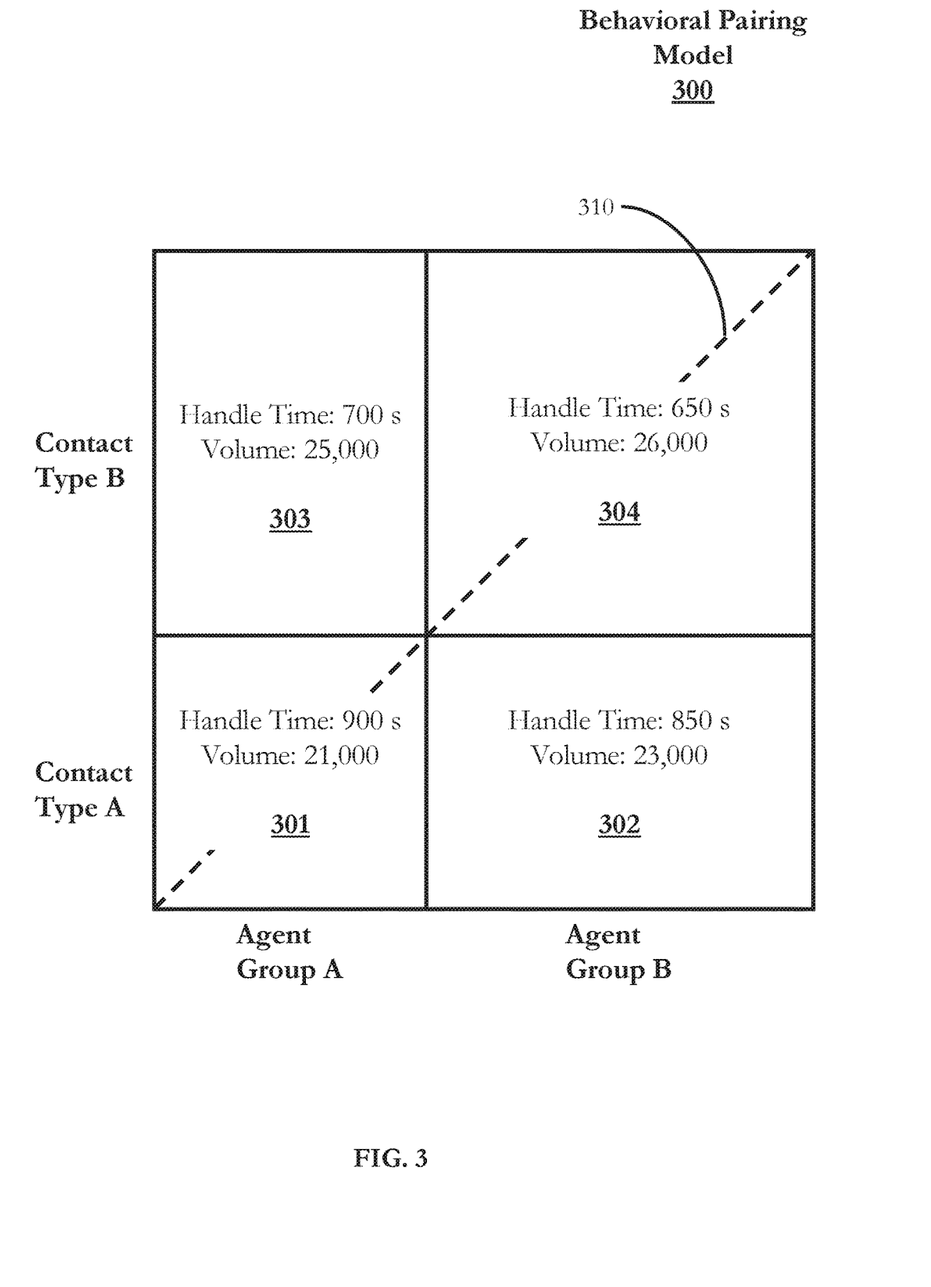
FIG. 3 depicts a schematic representation of a BP model according to embodiments of the present disclosure.

FIG. 3 depicts a schematic representation of a BP model 300 according to embodiments of the present disclosure. Similar to BP model 200 (FIG. 2), BP model 300 is a simple, hypothetical 2×2 model with an ordering of two groups of agents (Agent Group A and Agent Group B) and an ordering of two types of contacts (Contact Type A and Contact Type B).

In BP model 300, there are, again, four pairwise possibilities: a contact of Contact Type A is paired with an agent of Agent Group A (pairing 301); a contact of Contact Type A is paired with an agent of Agent Group B (pairing 302); a contact of Contact Type B is paired with an agent of Agent Group A (pairing 303); and a contact of Contact Type B is paired with an agent of Agent Group B (pairing 304).

In some embodiments of a BP strategy, the contact center system (via, e.g., a BP component or module embedded or communicatively coupled to the contact center system) may preferably pair contacts to agents along a diagonal of the model (e.g., diagonal 310). In the example of BP model 300, Contact Type A may be preferably paired to Agent Group A, and Contact Type B may be preferably paired to Agent Group B given optimal availability of choice.

In the hypothetical of BP model 300, a review of historical contact outcome data shows the following: pairing 301 shows a volume of 21,000 contacts and an average handle time ("AHT") of 900 seconds per contact; pairing 302 shows a volume of 23,000 contacts and an AHT of 850 seconds per contact; pairing 303 shows a volume of 25,000 contacts and an AHT of 700 seconds per contact; and pairing 304 shows a volume of 26,000 contacts and an average revenue of 650 seconds per contact. Notably, an effective behavioral pairing model for AHT should result in a reduction in AHT (i.e., a lower expected AHT indicates a positive expected gain).

Equations 3 and 4 below compute the baseline FIFO/random expected performance, the unadjusted BP expected performance, and the adjusted diagonal BP expected performance respectively:

$$(21{,}000 \cdot 900 + 23{,}000 \cdot 850 + 25{,}000 \cdot 700 + 26{,}000 \cdot 650)/(21{,}000 + 23{,}000 + 25{,}000 + 26{,}000) \approx 767 \quad \text{(Eq. 3)}$$

$$(21{,}000 \cdot 900 + 26{,}000 \cdot 650)/(21{,}000 + 26{,}000) \approx 762 \quad \text{(Eq. 4)}$$

Thus, the apparent, unadjusted expected performance of BP model 300 is approximately a 5 second per contact reduction in AHT (767 seconds per contact from Equation 3 less 762 seconds per contact from Equation 4), or a 0.7% gain over FIFO pairing. However, the real-world, adjusted expected performance of BP model 300 according to some embodiments is approximately a 1 second per contact increase in AHT (767 seconds per contact from Equation 3 less 768 seconds per contact from an adjusted diagonal computation), or a −0.1% gain compared to FIFO pairing.

In the example of hypothetical BP model 300, a contact center system may have naïvely selected BP model 300 as a viable model to obtain a 0.7% gain. However, based on the adjustment, the contact center system may avoid using BP model 300 because it is expected to decrease overall performance of the contact center system.

Figure 4:
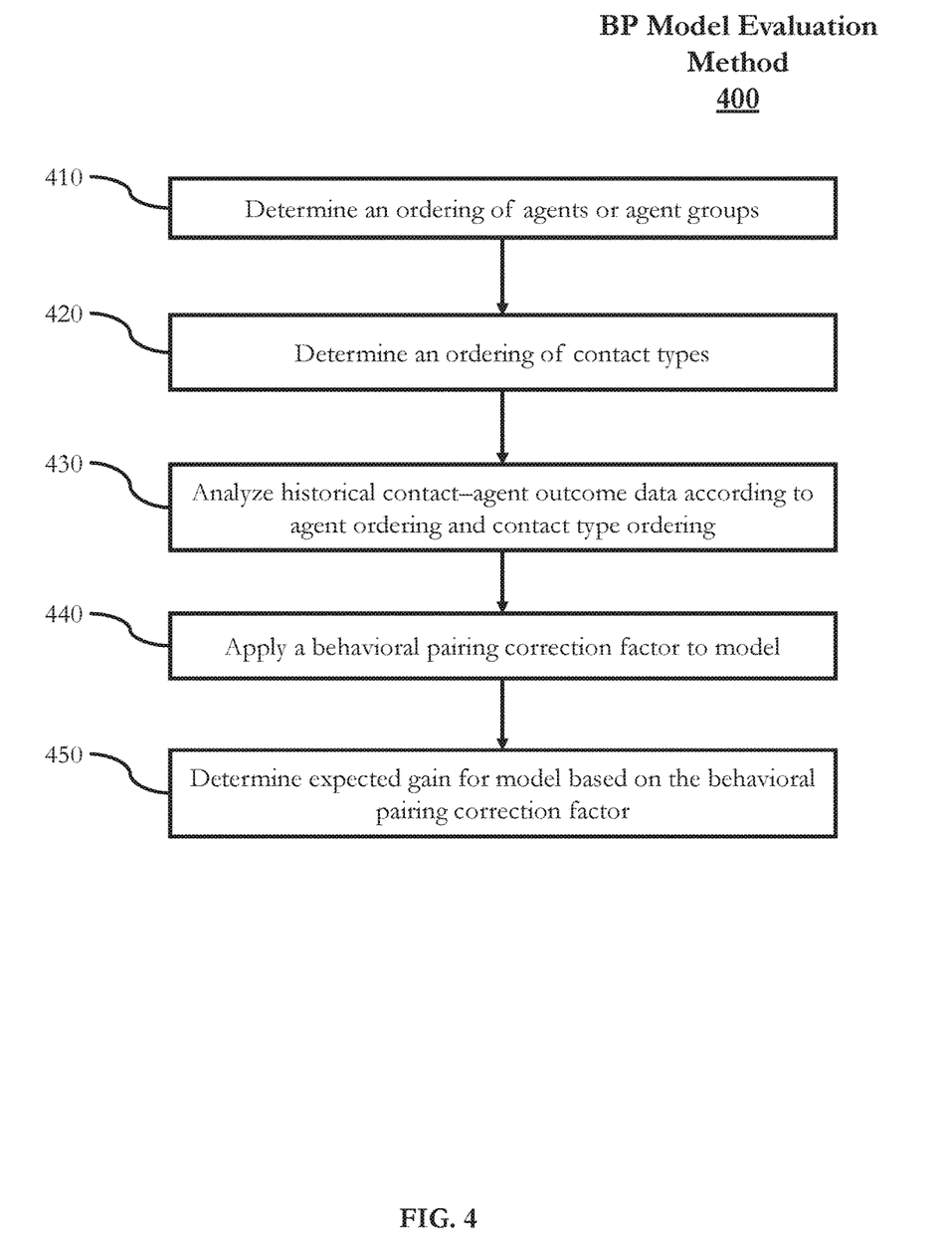
FIG. 4 shows a flow diagram of a BP model evaluation method according to embodiments of the present disclosure.

FIG. 4 shows a flow diagram of a BP model evaluation method 400 according to embodiments of the present disclosure. At block 410, the BP model evaluation method 400 may begin.

At block 410, an ordering of agents (or groups of agents) may be determined, and, at block 420, an ordering of contact types may be determined. A BP module or similar component may assist with defining contact types and/or agent groups based on a variety of variables (e.g., demographic, psychographic). Orderings of contact types and agents or agent groups may be based on a variety of performance metrics or other metrics (sales, AHT, influencability, etc.).

At block 430, historical contact-agent outcome data may be analyzed according to the agent and contact type orderings determined at blocks 410 and 420. For example, consider a historical pairing between Agent Alice and Contact Bob. An analysis of agent data for Agent Alice determines that Agent Alice would be considered a member of Agent Group A under the BP model determined at blocks 410 and 420, and an analysis of contact data for Contact Bob determines that Contact Bob would be considered a member of Contact Type B under the BP model. The relevant outcome of this contact-agent pairing would be credited to the pairwise pairing group of Agent Group A and Contact Type B. For example, if the contact center seeks to optimize sales, the pairing model evaluation module may note that one of the contacts in this pairing group resulted in a certain amount of revenue (e.g., $0, $10, $100).

The historical outcome data may include a small volume of outcome data, a large volume of outcome data, a threshold amount of outcome data determined to be statistically significant, etc. In some embodiments, outcome data may be limited to a rolling historical window (e.g., 10 days, 30 days, 90 days, 1 year, etc.). In some embodiments, outcome data may be limited to outcomes collected during "off" cycles when FIFO pairing may be in use. In other embodiments, outcome data may include random groupings of "on" (e.g., BP) and/or "off" (e.g., FIFO) pairings.

After the historical outcome data has been analyzed, the resulting BP model may be similar to BP model 200 (FIG. 2) or BP model 300 (FIG. 3), insofar as a grid of pairwise pairing groups for ordered agents or agent groups and contact types may indicate a contact volume and average outcome for each pairing group.

At block 440, a BP correction factor may be applied to the model. For example, as shown with respect to BP models 200 and 300 (FIGS. 2 and 3), a behavioral pairing adjustment may be applied to compute the weighted average of contacts along proportional lengths of the diagonal through BP-preferred pairings instead of the weighted proportion of contacts within the areas of the BP-preferred pairings. For other forms of BP, other comparable techniques may be applied to adjust gain computations to real-world expectations.

At block 450, an expected gain for the model may be determined based on the BP correction factor applied at block 440. In this way, a model may be favored or discarded over other models to optimize the expected gain over the off cycle pairing strategy (e.g., FIFO, PBR).

After block 450, the BP model evaluation method 400 may end. In some embodiments, the BP model evaluation method 400 may return to block 410 to begin determining alternative BP models to evaluate and compare to other possible BP models, seeking a model with higher or optimal gain.

At this point it should be noted that behavioral pairing model evaluation in a contact center system in accordance with the present disclosure as described above may involve the processing of input data and the generation of output data to some extent. This input data processing and output data generation may be implemented in hardware or software. For example, specific electronic components may be employed in a behavioral pairing model evaluation module or similar or related circuitry for implementing the functions associated with pairing model evaluation in a contact center system in accordance with the present disclosure as described above. Alternatively, one or more processors operating in accordance with instructions may implement the functions associated with BP in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for pairing model evaluation in a contact center system comprising:
determining, by at least one computer processor communicatively coupled to and configured to perform pairing model evaluation operations in the contact center system, an ordering of a plurality of agents;
determining, by the at least one computer processor, an ordering of a plurality of contact types;
analyzing, by the at least one computer processor, historical contact-agent outcome data according to the orderings of the pluralities of agents and contact types to construct a first pairing model;
determining, by the at least one computer processor, a first expected performance of the first pairing model in the contact center system;
determining, by the at least one computer processor, a second expected performance of a FIFO pairing strategy in the contact center system;
evaluating, by the at least one computer processor, the first expected performance of the first pairing model and the second expected performance of the FIFO pairing strategy to determine an expected gain of the contact center system using the first pairing model instead of the FIFO pairing strategy;
selecting, by the at least one computer processor, one of at least the first pairing model and the FIFO pairing strategy based on the evaluation of the first expected performance and the second expected performance; and
establishing, by the at least one computer processor, in a switch module of the contact center system, a connection between an agent of the plurality of agents and a contact of one of the plurality of contact types.

2. The method of claim 1, further comprising:
applying, by the at least one computer processor and prior to determining the first expected performance, a behavioral pairing correction factor to the first pairing model.

3. The method of claim 1, wherein the first pairing model is a behavioral pairing model.

4. The method of claim 1, wherein the first pairing model is based on a diagonal pairing strategy.

5. The method of claim 1, further comprising:
selecting, according to the first pairing model, by the at least one computer processor, at least one agent-contact type pairing for connection in the contact center system to optimize performance of the contact center system attributable to the first pairing model.

6. The method of claim 1, further comprising:
constructing, by the at least one computer processor, a second pairing model based at least on a second ordering of a second plurality of contact types different from the first plurality of contact types;
determining, by the at least one computer processor, a third expected performance of the contact center system using the second pairing model;
comparing, by the at least one computer processor, the third expected performance based on the second pairing model with the first expected performance based on the first pairing model; and
selecting, by the at least one computer processor, one of at least the first pairing model and the second pairing model based on the comparing of the first expected performance and the third expected performance.

7. The method of claim 1, further comprising:
determining, by the at least one computer processor, new contact-agent outcome data;
updating, by the at least one computer processor, the first pairing model based on the new contact-agent outcome data; and determining, by the at least one computer processor, a third expected performance of the contact center system using the updated first pairing model.

8. A system for pairing model evaluation in a contact center system comprising:
at least one computer processor communicatively coupled to and configured to perform pairing model evaluation operations in the contact center system, wherein the at least one computer processor is further configured to:
determine an ordering of a plurality of agents;
determine an ordering of a plurality of contact types;
analyze historical contact-agent outcome data according to the orderings of the pluralities of agents and contact types to construct a first pairing model;
determine a first expected performance of the first pairing model in the contact center system;
determine a second expected performance of a FIFO pairing strategy in the contact center system;
evaluate the first expected performance of the first pairing model and the second expected performance of the FIFO pairing strategy to determine an expected gain of the contact center system using the first pairing model instead of the FIFO pairing strategy;
select one of at least the first pairing model and the FIFO pairing strategy based on the evaluation of the first expected performance and the second expected performance; and
establish, in a switch module of the contact center system, a connection between an agent of the plurality of agents and a contact of one of the plurality of contact types.

9. The system of claim 8, wherein the at least one computer processor is further configured to:
apply, prior to determining the first expected performance, a behavioral pairing correction factor to the first pairing model.

10. The system of claim 8, wherein the first pairing model is a behavioral pairing model.

11. The system of claim 8, wherein the first pairing model is based on a diagonal pairing strategy.

12. The system of claim 8, wherein the at least one computer processor is further configured to:
select, according to the first pairing model, at least one agent-contact type pairing for connection in the contact center system to optimize performance of the contact center system attributable to the first pairing model.

13. The system of claim 8, wherein the at least one computer processor is further configured to:
construct a second pairing model based at least on a second ordering of a second plurality of contact types different from the first plurality of contact types;
determine a third expected performance of the contact center system using the second pairing model;
compare the third expected performance based on the second pairing model with the first expected performance based on the first pairing model; and
select one of at least the first pairing model and the second pairing model based on the comparing of the first expected performance and the third expected performance.

14. The system of claim 8, wherein the at least one computer processor is further configured to:
determine new contact-agent outcome data;
update the first pairing model based on the new contact-agent outcome data; and
determine a third expected performance of the contact center system using the updated first pairing model.

15. An article of manufacture for pairing model evaluation in a contact center system comprising:
a non-transitory processor readable medium; and
instructions stored on the medium;
wherein the instructions are configured to be readable from the medium by at least one computer processor communicatively coupled to and configured to perform pairing model evaluation operations in the contact center system and thereby cause the at least one computer processor to operate so as to:
determine an ordering of a plurality of agents;
determine an ordering of a plurality of contact types;
analyze historical contact-agent outcome data according to the orderings of the pluralities of agents and contact types to construct a first pairing model;
determine a first expected performance of the first pairing model in the contact center system;
determine a second expected performance of a FIFO pairing strategy in the contact center system;
evaluate the first expected performance of the first pairing model and the second expected performance of the FIFO pairing strategy to determine an expected gain of the contact center system using the first pairing model instead of the FIFO pairing strategy;
select one of at least the first pairing model and the FIFO pairing strategy based on the evaluation of the first expected performance and the second expected performance; and
establish, in a switch module of the contact center system, a connection between an agent of the plurality of agents and a contact of one of the plurality of contact types.

16. The article of manufacture of claim 15, wherein the at least one computer processor is further caused to operate so as to:
apply, prior to determining the first expected performance, a behavioral pairing correction factor to the first pairing model.

17. The article of manufacture of claim 15, wherein the first pairing model is a behavioral pairing model.

18. The article of manufacture of claim 15, wherein the first pairing model is based on a diagonal pairing strategy.

19. The article of manufacture of claim 15, wherein the at least one computer processor is further caused to operate so as to:
select, according to the first pairing model, at least one agent-contact type pairing for connection in the contact center system to optimize performance of the contact center system attributable to the first pairing model.

20. The article of manufacture of claim 15, wherein the at least one computer processor is further caused to operate so as to:
construct a second pairing model based at least on a second ordering of a second plurality of contact types different from the first plurality of contact types;
determine a third expected performance of the contact center system using the second pairing model;
compare the third expected performance based on the second pairing model with the first expected performance based on the first pairing model; and
select one of at least the first pairing model and the second pairing model based on the comparing of the first expected performance and the third expected performance.

21. The article of manufacture of claim 15, wherein the at least one computer processor is further caused to operate so as to:
   determine new contact-agent outcome data;
   update the first pairing model based on the new contact-agent outcome data; and
   determine a third expected performance of the contact center system using the updated first pairing model.

* * * * *